(12) United States Patent
Lakshmanan et al.

(10) Patent No.: US 10,083,402 B2
(45) Date of Patent: *Sep. 25, 2018

(54) PRESENTING ANTICIPATED USER SEARCH QUERY RESULTS PROMPTED BY A TRIGGER

(71) Applicant: International Business Machines Corporation, Armonk, NY (US)

(72) Inventors: Geetika T. Lakshmanan, Winchester, MA (US); Martin A. Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 508 days.

This patent is subject to a terminal disclaimer.

(21) Appl. No.: 14/729,189

(22) Filed: Jun. 3, 2015

(65) Prior Publication Data

US 2016/0147847 A1 May 26, 2016

Related U.S. Application Data

(63) Continuation of application No. 14/551,422, filed on Nov. 24, 2014.

(51) Int. Cl.
*G06F 7/00* (2006.01)
*G06N 99/00* (2010.01)
*G06F 17/30* (2006.01)

(52) U.S. Cl.
CPC ..... *G06N 99/005* (2013.01); *G06F 17/30867* (2013.01)

(58) Field of Classification Search
None
See application file for complete search history.

(56) References Cited

U.S. PATENT DOCUMENTS

2003/0217036 A1 11/2003 Haunschild et al.
2004/0034652 A1 2/2004 Hofmann et al.
(Continued)

FOREIGN PATENT DOCUMENTS

EP 1643390 A1 4/2006
EP 2722775 A1 4/2014
(Continued)

OTHER PUBLICATIONS

Cheng et al; "Actively predicting diverse search intent from user browsing behaviors", International World Wide Web Conference Committee, pp. 221-230. ACM, 2010.
(Continued)

*Primary Examiner* — Thu Nga Nguyen
(74) *Attorney, Agent, or Firm* — Michael O'Keefe

(57) ABSTRACT

A method for presenting search query results is provided. The method may include detecting an occurrence of the trigger event. The method may include determining a category of information based on data associated with the trigger event. The method may include identifying at least one constraint based on the determined category of information. The method may include appending to the identified at least one constraint to the determined category of information. The method may include generating at least one search query. The method may include selecting at least one candidate website based on the category of information. The method may include performing the at least one search query on the at least one candidate website. The method may include filtering each search query result within the search query results. The method may include sending each filtered search query result within the search query results to a user.

6 Claims, 3 Drawing Sheets

(56) References Cited

U.S. PATENT DOCUMENTS

| | | | |
|---|---|---|---|
| 2009/0177645 A1 | 7/2009 | Heck | |
| 2011/0184954 A1 | 7/2011 | Nelson | |
| 2011/0258148 A1 | 10/2011 | Gao et al. | |
| 2012/0005148 A1 | 1/2012 | Horvitz et al. | |
| 2013/0246383 A1 | 9/2013 | White et al. | |
| 2014/0253319 A1* | 9/2014 | Chang | H04M 1/72522 340/521 |
| 2014/0344304 A1* | 11/2014 | Topatan | G06F 17/3064 707/767 |
| 2015/0039647 A1* | 2/2015 | Chan | G06F 17/30867 707/769 |

FOREIGN PATENT DOCUMENTS

| | | |
|---|---|---|
| WO | 0244841 A2 | 6/2002 |
| WO | 2007012912 A1 | 2/2007 |
| WO | 2009108660 A1 | 9/2009 |
| WO | 2011075119 A1 | 6/2011 |
| WO | 2013158840 A1 | 10/2013 |
| WO | 2013169912 A2 | 11/2013 |

OTHER PUBLICATIONS

Kim et al; "Personalized ranking of search results with implicitly learned user interest hierarchies.", Computer Sciences Department Technical Report CS-2005-11, Florida Institute of Technology, Melbourne, Florida. 10 pages.

Marrs, "Predictive Search: Is This the Future or the End of Search?", Jun. 24, 2013,http://www.wordstream.com/blog/ws/2013/06/24/predictive-search#, pp. 1-7, accessed Aug. 26, 2014.

http://www.youtube.com/watch?v=d7Xv3YUc9SI , "App Review: Grokr—Predictive Search and Discovery Service" —YouTube, published Apr. 30, 2013, pp. 1-2, accessed Aug. 26, 2014.

http://www.sdmts.com/go_app.asp, Metropolitan Transit System, "GO! App: Arrival Times on Your iPhone, Android Phone, or BlackBerry", pp. 1-7, accessed Aug. 26, 2014.

http://www.google.com/landing/now/#whatisit: "Access Google Now on Android—The search app", accessed Aug. 26, 2014. pp. 1-2.

Lakshmanan et al; "Presenting Anticipated User Search Query Results Prompted by a Trigger," U.S. Appl. No. 14/551,422, filed Nov. 24, 2014.

List of IBM Patents or Patent Applications Treated as Related.

* cited by examiner

PRESENTING ANTICIPATED USER SEARCH QUERY RESULTS PROMPTED BY A TRIGGER

BACKGROUND

The present invention generally relates to the field of computing, and more particularly to search queries.

Search query anticipation relates to technology that predicts what a user may wish to search for based on particular user input information. Currently, some technologies, such as autocomplete, attempt to anticipate user preferred search terms based on user input words and characters that the user has entered into a search field. The use of such technologies may save time during the search process and may prevent spelling errors in the search terms. Other technologies, such as personal prediction applications, may record user habits and assist with a particular user search query based on the previous habits of the user.

SUMMARY

According to one embodiment, a method for presenting at least one anticipated search query result, wherein the at least one search query result is determined based on a plurality of data associated with a trigger event is provided. The method may include detecting an occurrence of the trigger event. The method may include determining a category of information based on a plurality of data associated with the trigger event. The method may include identifying at least one constraint based on the determined category of information. The method may include appending to the identified at least one constraint to the determined category of information. The method may include generating at least one search query, based on the appended identified at least one constraint. The method may include selecting at least one candidate website based on the category of information. The method may include performing the at least one search query on the at least one candidate website, wherein each of the at least one performed search query generates a plurality of search query results. The method may include filtering each search query result within the plurality of search query results. The method may include sending each filtered search query result within the plurality of search query results to a user.

According to another embodiment, a computer system for presenting at least one anticipated search query result, wherein the at least one search query result is determined based on a plurality of data associated with a trigger event is provided. The computer system includes one or more processors, one or more computer-readable memories, one or more computer-readable tangible storage medium, and program instructions stored on at least one of the one or more tangible storage medium for execution by at least one of the one or more processors via at least one of the one or more memories, where the computer system is capable of performing a method. The computer system may include detecting an occurrence of the trigger event. The computer system may include determining a category of information based on a plurality of data associated with the trigger event. The computer system may include identifying at least one constraint based on the determined category of information. The computer system may include appending to the identified at least one constraint to the determined category of information. The computer system may include generating at least one search query, based on the appended identified at least one constraint. The computer system may include selecting at least one candidate website based on the category of information. The computer system may include performing the at least one search query on the at least one candidate website, wherein each of the at least one performed search query generates a plurality of search query results. The computer system may include filtering each search query result within the plurality of search query results. The computer system may include sending each filtered search query result within the plurality of search query results to a user.

According to yet another embodiment, a computer program product for presenting at least one anticipated search query result, wherein the at least one search query result is determined based on a plurality of data associated with a trigger event is provided. The computer program product includes one or more computer-readable tangible storage medium and program instructions stored on at least one of the one or more tangible storage medium, the program instructions executable by a processor. The computer program product may include instructions to detect an occurrence of the trigger event. The computer program product may include instructions determine a category of information based on a plurality of data associated with the trigger event. The computer program product may include instructions identify at least one constraint based on the determined category of information. The computer program product may include instructions append to the identified at least one constraint to the determined category of information. The computer program product may include instructions generate at least one search query, based on the appended identified at least one constraint. The computer program product may include instructions select at least one candidate website based on the category of information. The computer program product may include instructions perform the at least one search query on the at least one candidate website, wherein each of the at least one performed search query generates a plurality of search query results. The computer program product may include instructions filter each search query result within the plurality of search query results. The computer program product may include instructions send each filtered search query result within the plurality of search query results to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
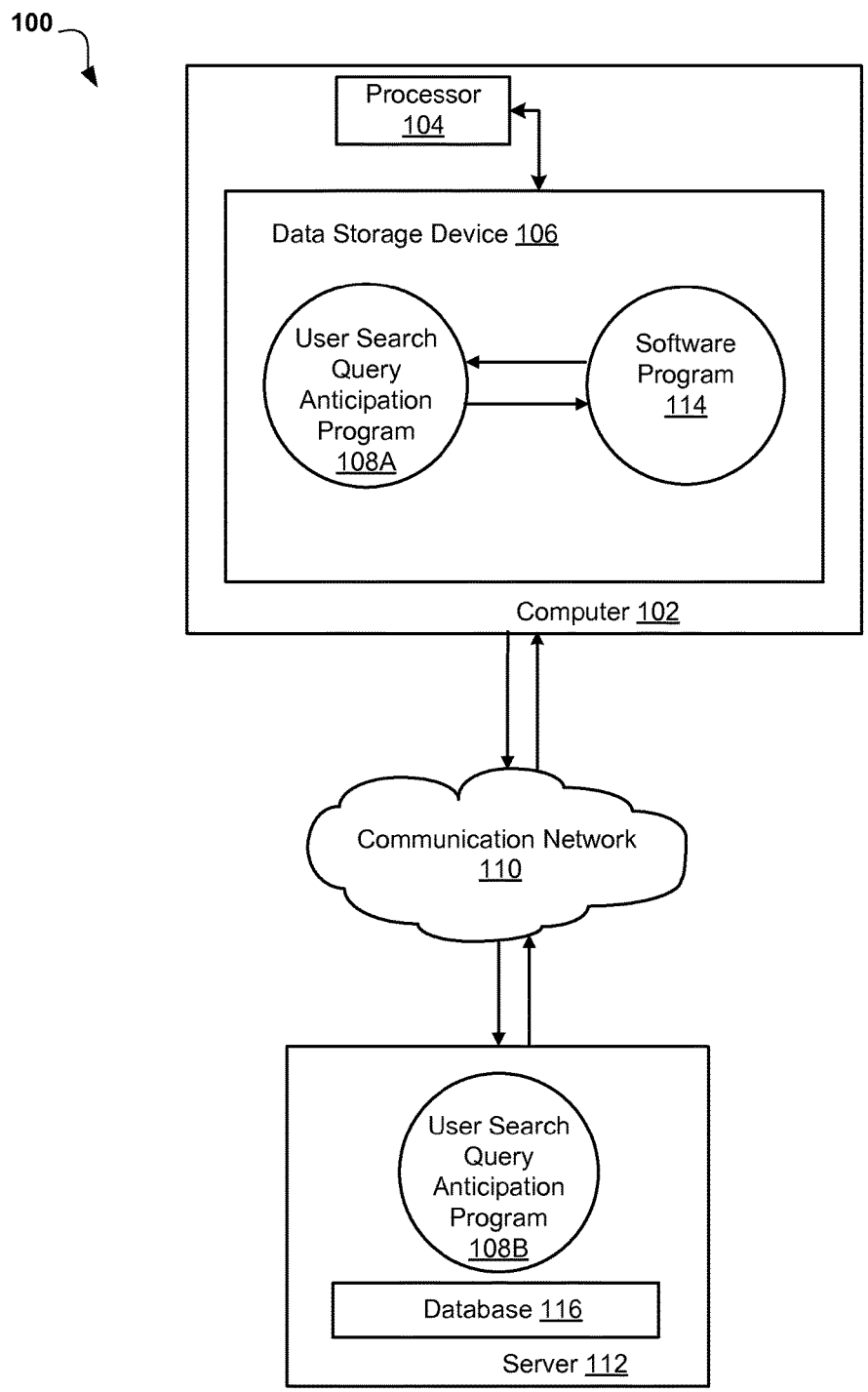
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to user search query anticipation. The following described exemplary embodiments provide a system, method, and program product to, among other things, anticipate and perform user search queries and summarize and present the results to the user. Additionally, the present embodiment has the capacity to improve the technical field of search querying by implementing logistics to anticipate user search terms, which may save time and resources for the user. Furthermore, the present embodiment may aggregate, summarize, and rank search results to be sent to the user.

As previously described, user search query anticipation may save a user time and resources when performing tasks. Currently, a user may utilize a search engine to gather information about an event or research a particular topic related to the event. After an initial query, the user may desire more information or wish to refine information presented in the initial query. For example, the user may wish to change one word in the initial query to allow for slightly different results. Upon gathering the desired information, the user may purchase a product or schedule a particular task related to the search query. The performance of multiple search queries and review of query results may be laborious and time consuming for the user.

Similarly, commercial enterprises may view a user as a prospective customer and may wish to predict future search queries for the user in order to better understand customer interests. Knowledge of potential future search queries may allow commercial enterprises to present relevant data, such as pricing, availability, and safety ratings, to the user. As such, it may be advantageous, among other things, to anticipate user search query terms based on presented data, perform a search query that locates the desired information, and filter the discovered information.

According to the present embodiment, machine learning may be implemented to anticipate user search queries based on particular keywords within an event, such as an email draft, a calendar invitation, a text message, or phone call from a particular person or location. Thereafter, a base search query may be formulated. Additionally, variations of the base search query may also be formulated that may contain additional constraints using machine learning to understand historical user search criteria and user preferences in a particular area, such as a user preferred airline when booking flights. Then, the search queries may be performed and the performed search query results may be filtered. Furthermore, the filtered list of search results may be provided to the user in the appropriate context, such as when the user is creating a notification for a social event for which the user must purchase a gift.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to anticipate user search query terms and present the anticipated results. According to at least one implementation, a trigger event may occur that contains specific keywords, which will initiate the search query system. Thereafter, the search query system may determine a search category within which to perform a query. Then, the search query system may apply more specific constraints to the search category in order to generate a base search query. Furthermore, variations upon the initial search query may be generated. Thereafter, a list of candidate websites may be generated upon which a search may be performed. Then, the search query system may perform the search queries through the list of candidate websites. Thereafter, the results of the search queries may be filtered. Then, the filtered search query results may be presented to the user in an appropriate context. Furthermore, the search query system may store information regarding previously performed search queries and user information to improve the execution of future anticipated search queries.

Referring now to FIG. 1, an exemplary networked computer environment 100 in accordance with one embodiment is depicted. The networked computer environment 100 may include a computer 102 with a processor 104 and a data storage device 106 that is enabled to run a User Search Query Anticipation Program 108A and a Software Program 114. The Software Program 114 may be a search query program, a calendar organization program, a text messaging program, a chat program, an internet browser, and an email program. The User Search Query Anticipation Program 108A may communicate with the Software Program 114. The networked computer environment 100 may also include a server 112 that is enabled to run a User Search Query Anticipation Program 108B and a communication network 110. The networked computer environment 100 may include a plurality of computers 102 and servers 112, only one of which is shown for illustrative brevity. According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a User Search Query Anticipation Program 108A and 108B may run on the client computer 102 or on the server computer 112. The User Search Query Anticipation Program 108A, 108B may anticipate and perform user search queries and present the query results. For example, a user using a computer, such as computer 102, may use a software application 114, such as Firefox® (Firefox and all Firefox-based trademarks and logos are trademarks or registered trademarks of Mozilla and/or its affiliates), that interacts with the User Search Query Anticipation Program 108A, 108B and a database 116 to anticipate user search query terms. The User Search Query Anticipation method is explained in further detail below with respect to FIG. 2.

Figure 2:
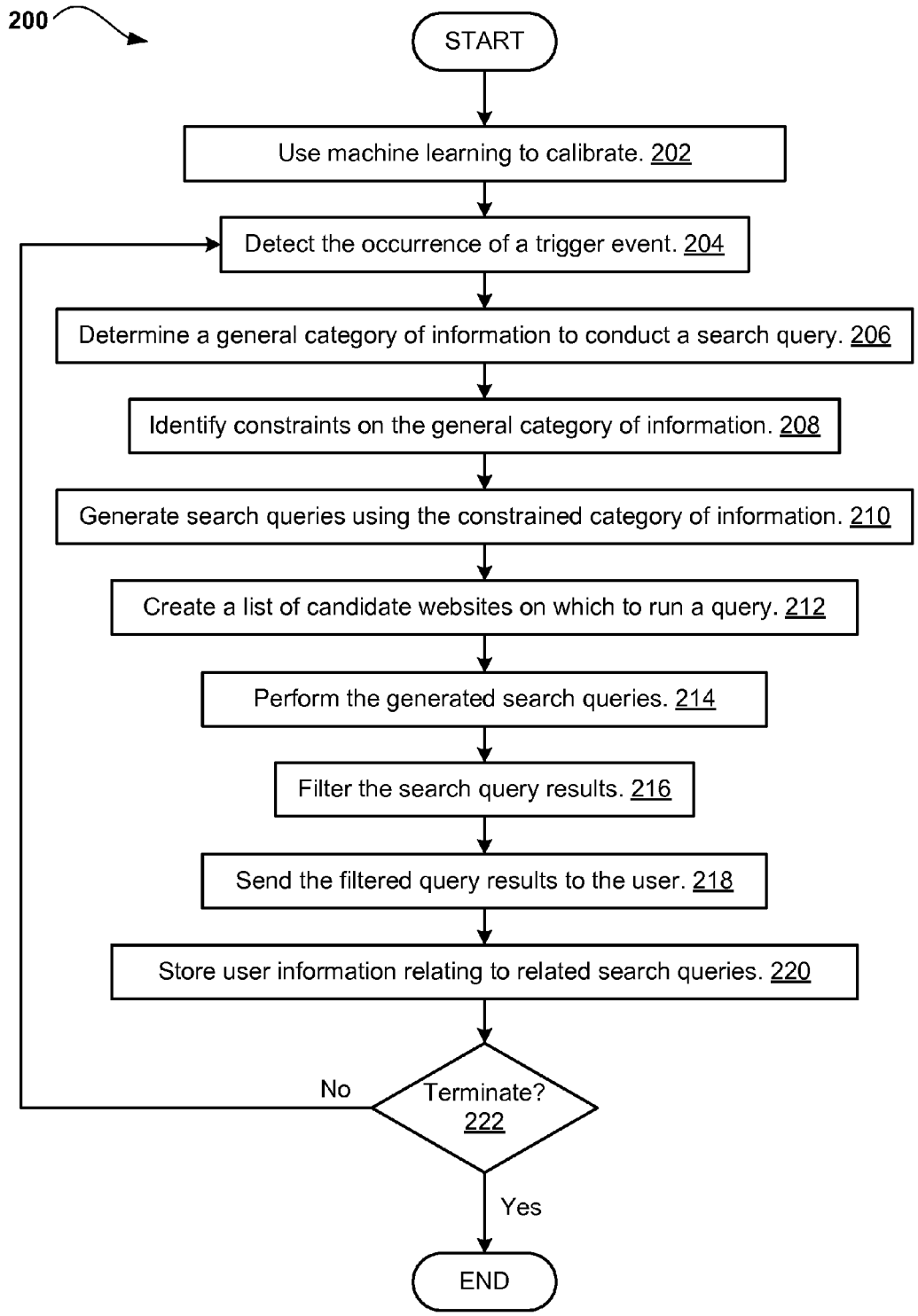
FIG. 2 is an operational flow chart illustrating the steps carried out by a program to present anticipated user search query results prompted by a trigger.

FIG. 2, an operational flowchart 200 illustrating the steps carried out by a program to anticipate and perform user search queries and present the query results. At 202, current technology, such as machine learning may be used to calibrate the User Search Query Anticipation Program 108A, 108B (FIG. 1) using received data. Machine learning is a method that allows a computer to gather data without being explicitly programmed by a programmer. Prior to receiving and reacting to a trigger event, such as the arrival of an email, the advent of an email, the receipt of a text message, the user visiting a particular website, a calendar event notification, a reminder set on a mobile device, or a phone call with a particular person, calibration may be required. As such, calibration may enable the User Search Query Anticipation Program 108A, 108B (FIG. 1) to implement an accurate prediction in response to the trigger event. The User Search Query Anticipation Program 108A, 108B (FIG. 1) may use machine learning to anticipate likely search queries the user may perform in the future based on certain keywords contained within a trigger event.

Additionally, machine learning may also be implemented to allow the User Search Query Anticipation Program 108A, 108B (FIG. 1) to understand user preferences and frequent user actions when certain criteria are presented. For example, the User Search Query Anticipation Program 108A, 108B (FIG. 1) may use machine learning to determine that the user prefers to fly Delta® (Delta® and all Delta-based trademarks and logos are trademarks or registered trademarks of Delta Air Lines and/or its affiliates) based on user purchases or user search queries. Similarly, the User Search Query Anticipation Program 108A, 108B (FIG. 1) may use machine learning to correlate the frequency or percentage chance a user may conduct a search query for a particular product. For example, a user may receive an email with certain terms contained in the body of the email. As such, when the email is received reminding the user of an upcoming birthday for an 8-year-old boy whose favorite toys are Lego® building blocks (Lego® and all Lego-based trademarks and logos are trademarks or registered trademarks of The Lego Group and/or its affiliates), the User Search Query Anticipation Program 108A, 108B (FIG. 1) may use machine learning to determine that the user is then highly likely to search for and purchase Lego® building blocks in response.

Next at 204, once properly calibrated through machine learning, the User Search Query Anticipation Program 108A, 108B (FIG. 1) may detect the occurrence of a trigger event. The trigger event detected by the User Search Query Anticipation Program 108A, 108B (FIG. 1) may be an event, such as the arrival of an email, the advent of an email, the receipt of a text message, the user visiting a particular website, a calendar event notification, a reminder set on a mobile device, or a phone call with a particular person. For example, when a user receives an email regarding an upcoming conference, the User Search Query Anticipation Program 108A, 108B (FIG. 1) may recognize the email as a trigger event since it contains certain language, such as "birthday present" or "upcoming conference," that may require the user to conduct a search query in the future.

Then at 206, upon detecting the occurrence of the trigger event, the User Search Query Anticipation Program 108A, 108B (FIG. 1) may determine a general category of information upon which to conduct a search query. Therefore, the User Search Query Anticipation Program 108A, 108B (FIG. 1) may use the machine learning from step 202 to accurately detect the general category of information based on the data received within the trigger event. For example, once the user receives a notification email regarding an upcoming conference, the User Search Query Anticipation Program 108A, 108B (FIG. 1) may detect, through previous machine learning, that a search query may be performed within the categories of "reserve airline ticket," "reserve rental car," and "reserve hotel room."

Next at 208, the User Search Query Anticipation Program 108A, 108B (FIG. 1) may identify constraints on the general category of information. As such, once a general category of information is determined, additional terms may be populated that further specify the category of information based on information contained within the trigger event. For example, if the user received an email regarding an upcoming airline flight, the User Search Query Anticipation Program 108A, 108B (FIG. 1) may identify the category of information to perform a search query within as "buy airline ticket." This category may not be specific enough to create an accurately predictive search query, since many airlines exist and the date and destination are not known simply based on the general category of information. Therefore, the User Search Query Anticipation Program 108A, 108B (FIG. 1) may mine further data provided within the trigger event to specify more information to the general category of information. For example, for the "buy airline ticket" general category of information, the User Search Query Anticipation Program 108A, 108B (FIG. 1) may be able to mine the flight date, preferred flight time, destination city, departure city, and seat location on the plane from additional data contained within the trigger event in order to further constrain the general category of information. Furthermore, machine learning and correlation analysis may be used to train the User Search Query Anticipation Program 108A, 108B (FIG. 1) to predict parameter values that correlate with the general category of information. For example, if a user's previously purchased airfare was a window seat in economy class on an American Airlines® flight (American Airlines® and all American Airlines-based trademarks and logos are trademarks or registered trademarks of American Airlines Group and/or its affiliates), the User Search Query Anticipation Program 108A, 108B (FIG. 1) may identify those constraints should be applied when the "purchase airline ticket" category of information is detected in future trigger events. In this situation, the User Search Query Anticipation Program 108A, 108B (FIG. 1) may be able to predict the user's preferred constraint on the general category of information even if the User Search Query Anticipation Program 108A, 108B (FIG. 1) is unable to mine the constraining data from the trigger event.

Then at 210, the User Search Query Anticipation Program 108A, 108B (FIG. 1) may generate search queries. Once the constrained category of information is determined, the User Search Query Anticipation Program 108A, 108B (FIG. 1) may generate a base search query. The base search query is a search query that uses the constrained category of information established in step 208. The User Search Query Anticipation Program 108A, 108B (FIG. 1) may create variations upon the base search query by appending category specific brands or requirements that may be unique to the user. For example, when creating a set of search queries for hotel reservations, the base search query may be "Reserve Hotel Room"+"2 nights"+"non-smoking." The variations upon this base search query may be "Reserve Hotel Room"+"2 nights"+"non-smoking"+"Hilton®" (Hilton® and all Hilton-based trademarks and logos are trademarks or registered trademarks of Hilton Worldwide and/or its affiliates) and "Reserve Hotel Room"+"2 nights"+"non-smoking"+"Marriott®" (Marriott® and all Marriott-based trademarks and logos are trademarks or registered trademarks of Marriott International and/or its affiliates).

Next at 212, the User Search Query Anticipation Program 108A, 108B (FIG. 1) may create a list of candidate websites on which to perform the variations of the base search query generated in step 210. Once search queries variations have been generated, the User Search Query Anticipation Program 108A, 108B (FIG. 1) may create a list of candidate websites that may contain a search engine on which to perform the generated search queries. A list of candidate websites may be created by executing a query on a search engine and storing the information by the User Search Query Anticipation Program 108A, 108B (FIG. 1) within a repository, such as database 116 (FIG. 1). For example, when the trigger event creates a general category of information of "purchase airline ticket," the list of candidate websites may include www.travelocity.com, www.expedia.com, www.aa.com, and www.delta.com. Furthermore, the list of candidate websites may be maintained and periodically updated for a general category of information. Also, the list of candidate websites may be created by implementing machine learning to determine which websites the user frequently performs similar searches within the general category of information. For example, for the general category of information of "purchase airline ticket," the User Search Query Anticipation Program 108A, 108B (FIG. 1) may discover the user frequently uses www.travelocity.com and www.expedia.com when making searches for airline tickets. However, the user never uses www.delta.com for such searches. Due to this information, the User Search Query Anticipation Program 108A, 108B (FIG. 1) may include www.travelocity.com and www.expedia.com but not www.delta.com in the list of candidate websites.

Then at 214, the User Search Query Anticipation Program 108A, 108B (FIG. 1) may perform the generated search queries on the list of candidate websites. Once the search queries are generated and the list of candidate websites are created, the User Search Query Anticipation Program 108A, 108B (FIG. 1) may perform the search queries using the search engines containing on the list of candidate websites. For example, if the variations on the base search query are "Reserve Hotel Room"+"2 nights"+"non-smoking"+"Hilton®" and "Reserve Hotel Room"+"2 nights"+"non-smoking"+"Marriott®" and the list of candidate websites includes www.travelocity.com and www.expedia.com, the User Search Query Anticipation Program 108A, 108B (FIG. 1) may perform "Reserve Hotel Room"+"2 nights"+"non-smoking"+"Hilton®" and "Reserve Hotel Room"+"2 nights"+"non-smoking"+"Marriott®" on the search engines located on both www.travelocity.com and www.expedia.com.

Next at 216, the User Search Query Anticipation Program 108A, 108B (FIG. 1) may filter the results of the performed search queries on the list of candidate websites. Once the search queries are performed, the User Search Query Anticipation Program 108A, 108B (FIG. 1) may filter the results by summarizing and ranking the results based on particular criteria, such as price and best result. The User Search Query Anticipation Program 108A, 108B (FIG. 1) may summarize the search query results so that the user may only be presented with the results that best satisfy the performed search query. For example, if the User Search Query Anticipation Program 108A, 108B (FIG. 1) performed the search queries "Reserve Hotel Room"+"2 nights"+"non-smoking"+"Hilton®" and "Reserve Hotel Room"+"2 nights"+"non-smoking"+"Marriott®," the search query results may be summarized to remove results that the User Search Query Anticipation Program 108A, 108B (FIG. 1) may determine the user may be uninterested in due to machine learning of the user's interests and patterns. Thereafter, the User Search Query Anticipation Program 108A, 108B (FIG. 1) may rank the search query results by the price of the hotel room, the proximity of the hotel room to the user's desired location, and the hotel room that best matches the search query criteria.

Then at 218, the User Search Query Anticipation Program 108A, 108B (FIG. 1) may present the filtered search query results to the user in an appropriate context. An appropriate context may be through a medium that allows the user to easily review the filtered search results and at a time convenient for the user to review the filtered search results. Once the search query results have been filtered, the User Search Query Anticipation Program 108A, 108B (FIG. 1) may send the filtered search query results to the user through a delivery medium, such as an email or a text message with embedded hyperlinks to the direct results. The User Search Query Anticipation Program 108A, 108B (FIG. 1) may send the filtered search query results at a time when the User Search Query Anticipation Program 108A, 108B (FIG. 1) detects the user may have an opportunity to review the results. For example, the user may activate an "away status" message on an instant messaging software program indicating the user may be on a coffee break. Upon detecting the language of the "away status" message, the User Search Query Anticipation Program 108A, 108B (FIG. 1) may deliver the filtered search query results to the user. For an additional example, the User Search Query Anticipation Program 108A, 108B (FIG. 1) may detect the user working on a presentation for a period of time which the user may be presenting at an out-of-town conference for which the user may not yet have book travel arrangements. After a designated period of time, the User Search Query Anticipation Program 108A, 108B (FIG. 1) may deliver the filtered search query results to the user to allow the user to book appropriate travel arrangements.

Next at 220, the User Search Query Anticipation Program 108A, 108B (FIG. 1) may store user information for related search queries in a database. The User Search Query Anticipation Program 108A, 108B (FIG. 1) may continually implement machine learning and data mining to perfect its prediction and summation performance. Upon delivering the filtered search query results to the user, the User Search Query Anticipation Program 108A, 108B (FIG. 1) may store the information provided to the user in a database to implement better prediction and summation of future search queries. For example, if the User Search Query Anticipation Program 108A, 108B (FIG. 1) delivered hotel information for Marriott® and Hilton® and, in response, the user booked a hotel room with Marriott®, then the User Search Query Anticipation Program 108A, 108B (FIG. 1) may store that selection for search query prediction and summation since the user may prefer Marriott® hotels.

Then at 222, it may be determined whether the method may terminate. According to one implementation, the method may terminate based on various circumstances, such as user intervention, the amount of elapsed time, system performance, etc. If it is determined that the method should terminate, then the method may end. However, if at 222, it is determined that the method should not terminate, then the method may continue back to step 204 to detect the occurrence of a trigger event.

It may be appreciated that FIG. 2 provides only an illustration of one implementation and does not imply any limitations with regard to how different embodiments may be implemented. Many modifications to the depicted environments may be made based on design and implementation requirements. For example, as previously described, the present embodiment may be implemented in hardware via a graphics display adapter to apply to either a subset or complete screen coverage and may be made software selectable as needed.

Figure 3:
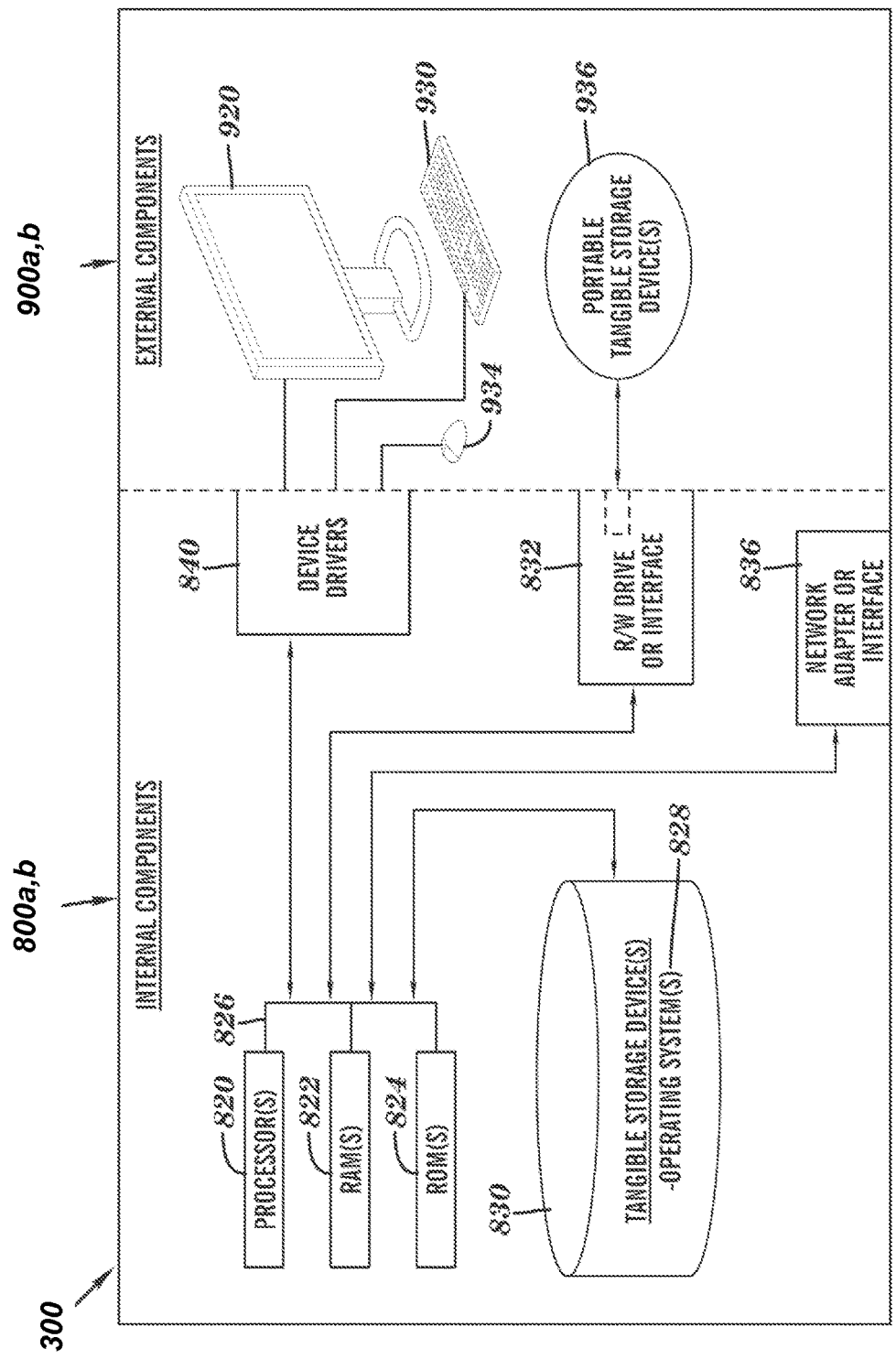
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the User Search Query Anticipation Program 108A (FIG. 1) and Software Program 114 (FIG. 1) in client computer 102 (FIG. 1) and User Search Query Anticipation Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as User Search Query Anticipation Program 108A (FIGS. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The User Search Query Anticipation Program 108A (FIG. 1) and Software Program 114 (FIG. 1) in client computer 102 (FIG. 1) and User Search Query Anticipation Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the User Search Query Anticipation Program 108A (FIG. 1) and Software Program 114 (FIG. 1) in client computer 102 (FIG. 1) and the User Search Query Anticipation Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for presenting at least one anticipated search query result, wherein the at least one search query result is determined based on a plurality of data associated with a trigger event, the method comprising:

detecting an occurrence of the trigger event, wherein the trigger event is selected from a group consisting of a telephone call and a reminder notification;

determining, at a time of detecting the trigger event, a topical search category based on a plurality of data associated with the trigger event;

identifying, at the time of detecting the trigger event, at least one search constraint based on the determined topical search category;

appending, at the time of detecting the trigger event, to the identified at least one search constraint to the determined topical search category;

generating, at the time of detecting the trigger event, a plurality of search queries, simultaneously, based on the appended identified at least one search constraint;

selecting at least one candidate website based on the topical search category;

performing, at the time of detecting the trigger event, the plurality of search queries, simultaneously, on the at least one candidate website, wherein each of the at least one performed search query generates a plurality of search query results;

filtering each search query result within the plurality of search query results; and sending each filtered search query result within the plurality of search query results to a user.

2. The method of claim 1, further comprising:
storing user information relating to the plurality of search query results in a repository.

3. The method of claim 1, further comprising:
calibrating the user search term anticipation system through machine learning.

4. The method of claim 1, wherein each of the performed search query results within the plurality of search query results are filtered using machine learning for a plurality of preferences and a plurality of patterns associated with the user.

5. The method of claim 1, wherein the at least one search constraint to append to the topical search category comprises a plurality of category specific brands and a plurality of requirements unique to the user.

6. The method of claim 1, wherein the filtered search results are sent to the user in an appropriate context.

* * * * *